United States Patent [19]

Mizusawa

[11] 4,089,496
[45] May 16, 1978

[54] CORD GROMMET

[75] Inventor: Akira Mizusawa, Fujisawa, Japan

[73] Assignee: Nifco Inc., Tokyo, Japan

[21] Appl. No.: 807,848

[22] Filed: Jun. 20, 1977

[30] Foreign Application Priority Data

Jun. 21, 1976 Japan ................... 51-72165

[51] Int. Cl.² ............................... F16L 5/00
[52] U.S. Cl. .......................... 248/56; 16/2;
174/153 G; 339/103 B
[58] Field of Search .......... 248/56; 174/65 G, 152 G,
174/153 G; 339/103 R, 103 B, 103 C, 103 M,
105, 274; 16/2; 403/353; 24/73 S; 85/5 P,
81–83

[56] References Cited

U.S. PATENT DOCUMENTS

| 2,494,814 | 1/1950 | Huth | 248/56 X |
| 3,243,759 | 3/1966 | Miller | 174/153 G X |
| 3,469,493 | 9/1969 | Fisher | 85/83 X |
| 3,580,988 | 5/1971 | Orlowski et al. | 248/56 X |
| 4,002,821 | 1/1977 | Satoh et al. | 248/56 X |
| 4,002,822 | 1/1977 | Kurosaki | 248/56 X |
| 4,033,535 | 7/1977 | Moran | 248/56 |

FOREIGN PATENT DOCUMENTS

| 1,374,197 | 8/1964 | France | 85/82 |
| 2,289,792 | 5/1976 | France | 85/81 |

Primary Examiner—Roy D. Frazier
Assistant Examiner—Rodney H. Bonck
Attorney, Agent, or Firm—Jack R. Halvorsen; Robert W. Beart

[57] ABSTRACT

Disclosed herein is a cord grommet, which comprises a female member of the shape of a tube having an approximately rectangular outside cross section and provided at one end thereof with a wall blind except for an oblong hole bored therein for passage of a cord and at the other open end thereof with an outer flange and a male member composed of a shaft having an approximately elliptic cross section and adapted to be rotatably set in position inside said female member and skirt-shaped engaging means adapted to encompass the flange of said female member, whereby a cord is fastened in a twisted state to a panel by a procedure comprising the steps of inserting said cord through the male and female members, bringing the two members into intimate contact with each other, inserting the two members in the coupled state into a perforation bored through the panel and giving the male member a relative rotation.

4 Claims, 17 Drawing Figures

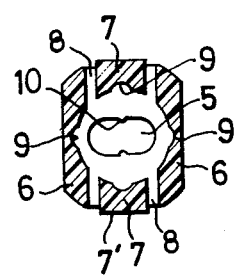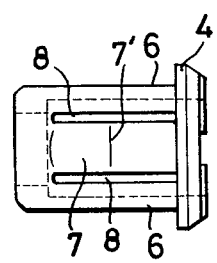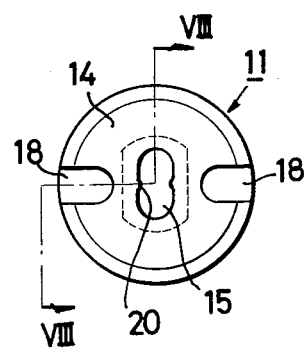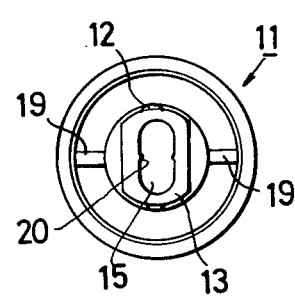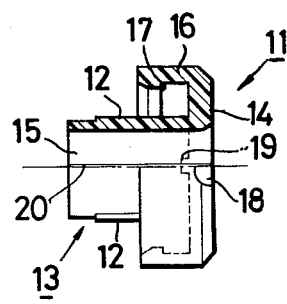

CORD GROMMET

BACKGROUND OF THE INVENTION

This invention relates to improvements in and concerning a cord grommet made of a thermoplastic resin and put to use where a cord of an oblong cross section is led out of a perforation formed in a panel such as a chassis, rear cover or case of an electric appliance, for the purpose of fastening the cord stably to the perforation in the panel for thereby minimizing possible electric interference between the cord and the panel, preventing the insulating coat of the cord from being damaged by the edge of the perforation in the panel and intercepting any pulling force exerted on the cord and thereby protecting the cord against otherwise possible separation from the terminal of the internal electric element to which the cord is connected.

Heretofore, various types of cord grommets have been proposed for the purpose mentioned above. Typical of these cord grommets are those disclosed by the common assignee in U.S. Ser. Nos. 699,814, now U.S. Pat. No. 4,002,821; 701,834; and 707,808, now U.S Pat. No. 4,002,822. These cord grommets are invariably composed of two members which are brought into face-to-face contact with each other with a cord interposed therebetween, one of said two members having a grooved inner face and the other member having a protruding inner face matching said grooved inner face. When such a grommet is assembled by bringing the two members into the face-to-face union across the intervening cord and the assembled grommet is inserted through the perforation in the panel, the grommet can be retained in said assembled state wherein the cord is held in a zigzagged bent form by the groove and the protrusion of the two matched members.

With such a grommet, however, since the cord is forced to assume a zigzagged bent state because of the confrontation between the groove and the protrusion, there is a fair possibility that the inner electric wires will be broken where the cord forms a sharp bend or the insulating coat of the cord will be scraped off where the gap formed between the groove and the protrusion narrows down so much as to form a constriction. Further at the time that the grommet is inserted in its assembled state into the perforation in the panel, since the cord is heavily bent by the engagement of the groove and the protrusion of the two matched members across the cord, there is produced high resilient force in the cord. When the grommet is set in position into the perforation formed in the panel such as of an electric appliance or it is removed from said perforation, therefore, there is entailed a disadvantage that the user is compelled to rely on a special tool designed to hold the two members of the grommet in tight engagement.

One object of the present invention is to provide a grommet which enables a given cord to be readily set in position into the perforation in the panel such as of a mechanical device or removed from the perforation without use of any special tool and yet precludes possible breakage of electric wires, damage to the insulating coat, etc.

SUMMARY OF THE INVENTION

To accomplish the object described above according to the present invention, there is provided a cord grommet which comprises a female member in the shape of a tube having one end thereof provided with a wall blind except for an oblong hole contained therein for passage of a cord and having the other end thereof left open and surrounded by an outer flange and a male member consisting of a shaft adapted to be inserted into said female member through the open end and retained in a rotatable state inside the female member and provided with oblong holes extending throughout the entire length thereof and a flange disposed at one end of said shaft and integrally incorporating therein an outer edge provided with means for providing engagement with the flange of said female member.

A cord to be fastened to a perforation formed in the panel of a given electric appliance is passed through the depressed holes of the female and male members. With the cord thus inserted therein, the two members are fastened to each other and consequently their respective flanges are brought into fast engagement stably enough to resist separation. The two members now in tight union are inserted into position in the perforation formed in the panel. Then, the male member is rotated with respect to the female member, so that the cord is twisted because of a change in the shape of the cavity formed by the two members. The cord held inside the cavity formed between the two members can be brought into a twisted state free from immoderate strain by giving a relative rotation to the male member inserted in the female member fastened in the panel. Thus, the cord is prevented from otherwise possible damage such as broken electric wires, fractured insulating coat, for example.

The other objects and characteristic features of the present invention will become apparent from the description to be given in further detail herein below with reference to the attached drawing.

BRIEF DESCRIPTION OF THE DRAWINGS

FIG. 5 is a front view showing a section taken along the line V—V of the female member of FIG. 3.

FIG. 6 is a plan view of the female member of FIG. 2.

FIG. 7 is a front view of the male member of said grommet of FIG. 1.

FIG. 8 is a side view showing a partial section taken along the line VIII—VIII of the male member of FIG. 7.

FIG. 9 is a rear view of the male member of FIG. 7.

DETAILED DESCRIPTION OF THE PREFERRED EMBODIMENTS

Figure 1:
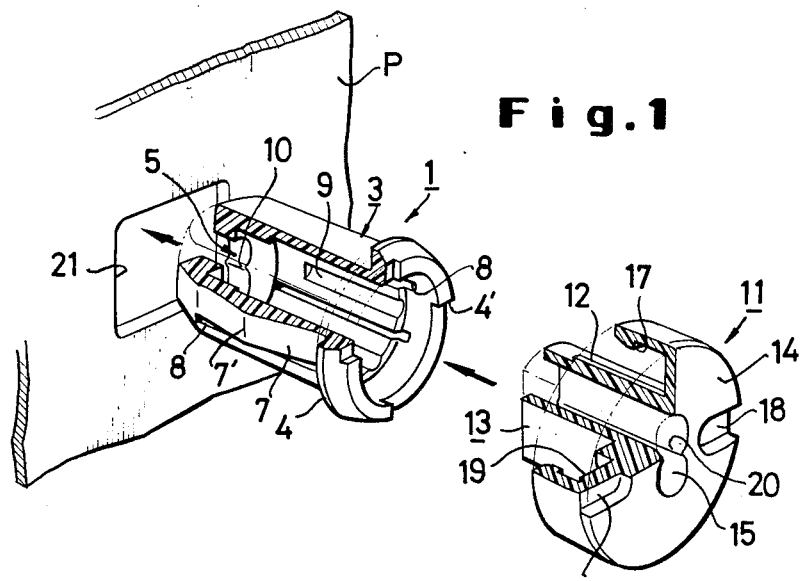
FIG. 1 is a partially cutaway perspective view of one preferred embodiment of the cord grommet of this invention, with the male and female members of the grommet held in a separated and opposed state.
Figure 2:
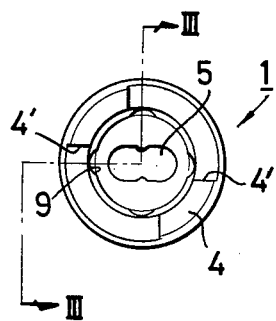
FIG. 2 is a front view of the female member of said grommet.
Figure 3:
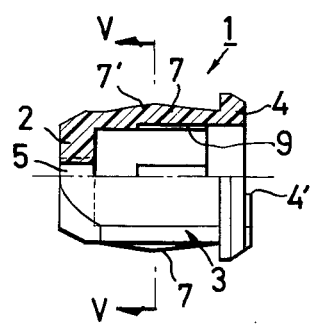
FIG. 3 is a side view showing a section taken along the line III—III of the female member of FIG. 2.
Figure 4:
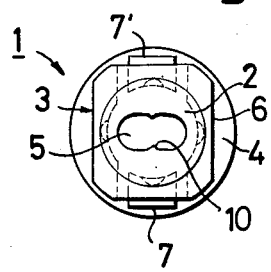
FIG. 4 is a rear view of the female member of FIG. 2.

The cord grommet of the present invention, as illustrated in FIG. 1, is composed of a female member (FIGS. 2-6) and a male member (FIGS. 7-9), and these two members are molded of a thermoplastic resin having a suitable degree of elasticity. The female member 1 consists of a tube 3 having one end thereof provided with a wall 2 and the other end thereof being completely open and having a flange 4 extending outwardly from the circumference thereof. Said wall 2 is provided with an oblong hole 5 for the passage of a cord.

In the preferred embodiment under discussion, the cavity formed inside the tube 3 has a substantially circular cross section while the tube itself has an approximately rectangular outside cross section as shown in FIG. 5. Longitudinal slits 8 provided in the tube 3 divide the tube into two opposed pairs of walls 6 and 7. One pair of walls 7 are provided on their outer faces each with an engaging projection 7' gradually inclined outwardly and adapted to snap into engagement with the edge of the perforation bored in the panel, causing the cord grommet to be fastened stably to the panel.

On the other hand, the male member 11 comprises a shaft 13 of an elliptic cross section for rotatable insertion into the cavity of the tube 3 of said female member 1 and a flange 14 integrally joined to one end of the shaft 13. In the shaft 13, an oblong hole 15 identical in cross-sectional shape with the oblong hole 5 of the female member is formed throughout the entire length thereof. The flange 14 is integrally provided with engaging means 16 of the shape of a skirt incorporating a claw 17 which permits an encompassing engagement of the flange 4 of the female member when the female and male members 1, 11 are brought into fast union.

The claw 17 incorporated in the flange 14 can be one complete piece extending throughout the entire inner circumference of said engaging means 16. Alternatively, it may comprise several pieces regularly spaced along the entire inner circumference. The leading end of the engaging means 16 is desired to be chamfered on the inside edge so that the engaging means 16 incorporating the claw 17 is readily permitted to ride over the edge of the flange 4 of the female member when the male and female members are brought into fast engagement.

Figure 11:
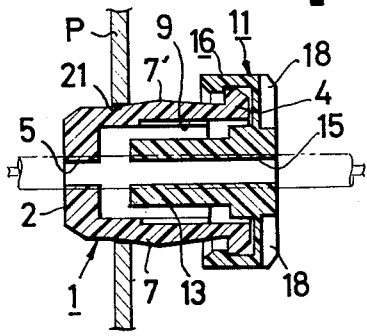
FIG. 11 is a longitudinally sectioned side view showing the state in which said female and male members are, in their assembled form, in the process of being inserted into the perforation formed in the panel.
Figure 12A:
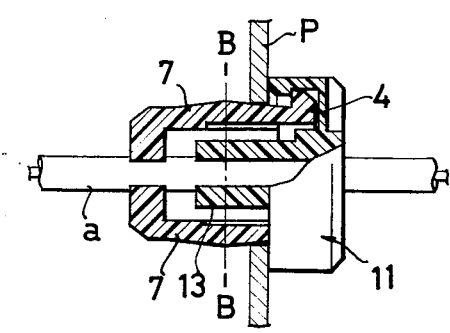
FIG. 12A is a sectioned side view showing the state in which the two members have already been inserted in the perforation formed in the panel.

The shaft 13 of the male member 11 has an approximately elliptical outside cross section as described above. As is seen in FIG. 9, the approximate ellipse has the shape that would be obtained cutting from a circle conforming to the approximately circular void inside the female member 1 the areas defined by a pair of symmetrically opposed chords drawn perpendicular to the minor axis of the oblong hole 15. This conformity is intended to ensure that the curved portion of the ellipse makes a sliding contact with the inner surface of the female member in order for the male member to enjoy freedom of rotation with reference to the female member. When the male member and the female member are brought into union in such a way that their respective depressed holes 5, 15 are in registration with each other, there is formed a gap between the tube 7 of the female member and the shaft 13 of the male member. When the female member 1 is set in position in the perforation 21 bored in the panel P as illustrated in FIG. 11, this gap serves to enable the engaging projection 7' of the female member which has collided into the edge of said perforation 21 to be pushed down inwardly so that the female member can be inserted with little force into the perforation 21 until the skirt-shaped engaging means 16 of the male member reaches the surface of the panel P. After the male and female members in a state of intimate contact have been inserted fully into the perforation 21 bored in the panel as illustrated in FIG. 12, the male member 11 is rotated by a right angle with reference to the female member. This rotation causes the engaging projection 7' of the female member to be deprived of any space for further own inward depression toward the shaft 13 of the male member as illustrated in FIG. 13. Consequently, the male and female members which are now in fast union are no longer able to come loose from perforation 21 in the panel P. They are held immovably on the panel P, with the panel pinched tightly between the skirt-shaped engaging means 16 of the male member and the engaging projection 7' of the female member.

Figure 13A:
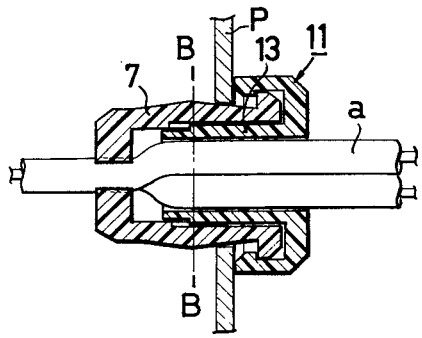
FIG. 13A is a sectioned side view showing the state in which the two members have been inserted in the perforation of the panel and the male member has been given a relative rotation by a right angle.

If, in the initial stage in the entire course of said procedure of grommet setting, a flexible cord containing two parallel wires and having an oblong cross section is passed through the depressed holes of the male and female members in advance, then the cord is immobilized in a twisted state as illustrated in FIG. 13A. Once the cord is set in this state, it is precluded from producing a motion in the longitudinal direction in response to a pulling force.

The length of the shaft 13 of the male member 11 is required to be shorter than the depth of the tube of the female member 1, namely the distance from the open end to the wall 2, by a length not smaller than the width of the cord desired to be fastened with the grommet. Owing to this difference, when the male and female members are brought into intimate contact, there occurs between the leading end of the shaft 13 of the male member and the wall 2 of the female member a space which permits required twisting of the cord.

Because of the resilience generated by the cord retained in its twisted state, the male and female members which have been relatively rotated by a right angle tend to turn back and resume their original positions in which their respective oblong holes 5, 15 register with each other. For the prevention of this undesirable effect of the resilience, protrusions 12 are provided one each on the curved surfaces of the shaft 13 of the male member which are adapted to slide on the inner surfaces of the female member and recesses 9 are formed on the inner surface of the female member 1 so that the two members are allowed to remain stationary, in the absence of an external force, in either position wherein their respective oblong holes 5, 15 are in perfect conformity with each other or are relatively rotated by a right angle from each other.

Further, in order that the male member and the female member which have been brought into intimate contact may be relatively rotated exactly by an angle of 90°, a stepped portion 4' is provided in a depression formed in the front surface of the female member and a projection 19 is provided in the rear surface of the flange 14 of the male member so that after the two members have been relatively rotated by 90° from the position having their respective oblong holes in registration, the projection 19 of the male member collides into the stepped portion 4' of the female member. Thus, the two members are prevented from making any further relative rotation beyond this point of collision.

Alternatively for the purpose of limiting the relative rotation of the two members to the angle of 90°, a claw 17 may be partially provided on the engaging means 16 of the flange of the male member and means for catching hold of said claw 17 provided on the flange 4 of the female member.

Since the preferred embodiment described to this point is intended for use with a relatively flexible electric cord, the work of twisting the cord within the inner cavity of grommet touched upon above can be accomplished without use of any tool. With due consideration paid to the possibility of the grommet being put to use with a rigid cord, the flange 14 of the male member is provided in the front surface thereof with a groove 18 adapted to admit a tool such as, for example, a pin-face driver serving to rotate the male member.

Figure 12B:
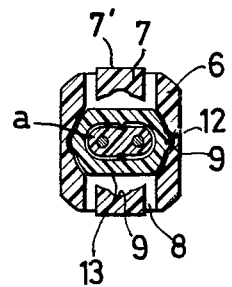
FIG. 12B is a sectioned view taken along the line B—B of the two members of FIG. 12A.
Figure 13B:
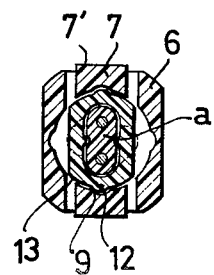
FIG. 13B is a sectioned view taken along the line B—B of the two members of FIG. 13A.
Figure 10:
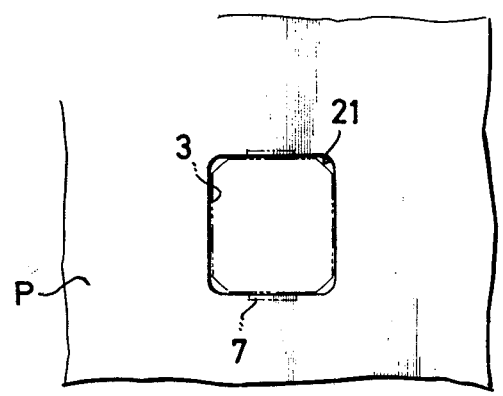
FIG. 10 is a front view of a perforation bored in a panel, illustrative of the relationship of the perforation with the outer shape of the female member.

In case where the cord with which the grommet is to be used happens to have a cross section of the shape of spectacles as illustrated in FIGS. 12B and 13B, either or both of the oblong holes 5, 15 of the male and female members may be provided on the inner face with projections 10, 20 so that the oblong holes will have a cross section exactly conforming with the outside cross section of the cord and will prevent the cord held therein from being twisted within the holes. Further, the leading end of the female member 1 can be tapered so as to facilitate the insertion of the female member into the perforation 21 bored in the panel P.

Figure 14:
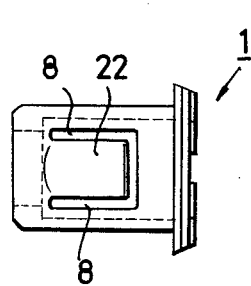
FIG. 14 is a side view illustrating another preferred embodiment of the female member in the cord grommet of the present invention.
Figure 15:
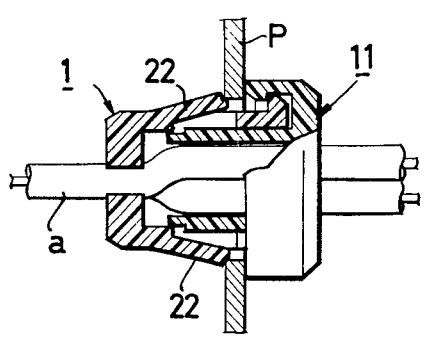
FIG. 15 is a partially sectioned side view showing the state in which the grommet of the present invention has been inserted into the perforation of the panel by use of the female member of FIG. 14.

FIGS. 14-15 represent another preferred embodiment of the grommet according to this invention, with an improvement given to the engagement projection of the female member.

In this preferred embodiment, tongue pieces 22 are formed by connecting flange-side edges of the slits 8 by inserting cuts and said tongue pieces 22 are slightly raised so that the tongue pieces snap into an immovable engagement with the edge of the perforation when the female member is inserted fully into the perforation bored in the panel P. In the aforementioned first preferred embodiment, when the male and female members are brought into fast union with their respective depressed holes relatively rotated by a right angle from each other, the grommet cannot be inserted into the perforation in the panel. The preferred embodiment under discussion has an advantage that the grommet can be passed into the perforation in the panel even when the two members are held in the state of fast union. According to the present invention, the cord can be set in position through the panel and the two members of the grommet held in the state of fast union can be easily and safely attached to the panel by a simple operation of relatively rotating the two members by a fixed angle and consequently bringing their respective oblong holes to positions rotated by 90° from each other as described above. The grommet thus attached to the panel holds the cord fast in a state free from immoderate strain and, accordingly, precludes the possibility of the cord suffering from troubles such as breakage of the electric wires and damage of the insulating coat, for example. Unlike the conventional grommet, the grommet of the present invention enables the insertion of the two members in their assembled state into the perforation in the panel to be accomplished without calling for immoderate force or requiring use of any special tool or skill. It has a further advantage that the two members already held in position through the perforation in the panel can be drawn out of the perforation with practically no force by merely causing the two members to be relatively rotated so much as to bring their respective depressed holes into registration with each other. This means that the grommet can be detached from and re-attached to the panel with extreme ease whenever it is found in need of repair.

Moreover, since the two members of the grommet can be put to use in their preparatorily assembled state, they need not be stored separately of each other, greatly adding to the ease of handling of the grommets of this invention both in shipping and when used in a production line.

What is claimed is:

1. A cord grommet comprising:
   (a) a female member of the shape of a tube having a non-circular outside cross section and an approximately circular inside cross section, one end of said tube being provided with a wall having an oblong hole bored for passage of a cord and the other end thereof being open and having an outer flange, said tube being divided by longitudinal slits into two opposed pairs of walls, the members of one pair of which are each provided with an engaging projection on the outside thereof and said tube being provided on the inside thereof with circumferentially spaced recesses and
   (b) a male member composed of a shaft of an approximately elliptic outside cross section and engaging means, said shaft being adapted to be inserted into said female member through the open end thereof and rotatably set in position therein, said male member including an oblong hole extending throughout the entire length thereof and further provided on the outside thereof with circumferentially spaced protrusions receivable by the recesses of said female member and said engaging means being integrally connected to one end of said shaft and provided on the outer boundary with a claw adapted to be engaged with the edge of the flange of said female member.

2. The cord grommet according to claim 1, wherein the flange of the female member is provided on the front surface of the flange thereof with a stepped portion and said male member engaging means includes a flange which is provided on the rear surface of said flange with a projection so that when the male and female members are brought into intimate contact and given a relative rotation, the relative rotation will be limited to the fixed angle of 90°.

3. The cord grommet according to claim 1, wherein the longitudinal slits formed in the opposed pairs of walls of said female member are interconnected at their flange-side ends by insertion of connecting cuts and the interconnected ends are raised to form tongue portions.

4. The cord grommet according to claim 1, wherein the flange of said male member is provided in the front surface thereof with a groove for admitting a tool serving to give a relative rotation to the male member.

* * * * *